(12) United States Patent
Kanayama

(10) Patent No.: US 6,919,928 B1
(45) Date of Patent: Jul. 19, 2005

(54) POSITION DETERMINING DEVICE

(75) Inventor: Atsushi Kanayama, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/273,726

(22) Filed: Mar. 22, 1999

(30) Foreign Application Priority Data

Mar. 23, 1998  (JP) .......................................... 10-074017

(51) Int. Cl.[7] .............................................. H04N 5/232
(52) U.S. Cl. ...................................................... 348/345
(58) Field of Search ................................ 348/345, 348; 382/255; 396/85, 89; 359/694, 697, 698

(56) References Cited

U.S. PATENT DOCUMENTS 5,930,054 A  *  7/1999  Kasuya ........................ 359/698

FOREIGN PATENT DOCUMENTS

| DE | 38 29 405 C2 | 9/1993 |
|---|---|---|
| DE | 44 13 098 A1 | 10/1995 |
| JP | 3-249713 A | 11/1991 |
| JP | 6-174999 A | 6/1994 |

* cited by examiner

Primary Examiner—Aung Moe
Assistant Examiner—Rashawn N Tillery
(74) Attorney, Agent, or Firm—Birch Stewart Kolasch & Birch, LLP

(57) ABSTRACT

A position determining device for a control knob includes a relative position determiner and an absolute position determiner. The standard output data of the potentiometer corresponding to the rotational limits of the control knob is recorded in a ROM during manufacturing of the device. Since the device is activated until the potentiometer reaches one of the limits, the operating amount of the control knob is determined in accordance with absolute position data outputted from the potentiometer. When the potentiometer reaches one of the rotational limits of the control knob, the standard data corresponding to the rotational limits is read from the ROM and set as an initial value for the determination by the rotary encoder. Thereafter, the operated amount of the control knob is determined in accordance with relative position data outputted from the rotary encoder.

12 Claims, 5 Drawing Sheets

POSITION DETERMINING DEVICE

BACKGROUND OF THE INVENTION

1. Field of the Invention

The present invention relates generally to a position determining device, and more particularly to a position determining device that is used suitably for a position determining device for determining the operated amount of a control member in a control unit that controls the focus, zoom, etc. of a TV camera lens electrically, and a position determining device for determining the position of a lens in the TV camera lens.

2. Description of Related Art

Generally, a control unit that controls the zoom and focus of a TV camera lens uses a potentiometer and a rotary encoder to determine the operated amount of a control member such as a control ring and a control knob. For instance, a control knob that rotates once to three times is widely used in a focus control unit for the TV camera lens. In such a control unit, the control knob has rotational limits, and therefore, an absolute position determiner such as a potentiometer and an absolute rotary encoder is preferably used for a determiner that determines the operated amount of the control knob.

The absolute rotary encoder, however, is not advantageous in view of the price, size, distinguishability and consumption of electricity, and is not a desirable means at present.

On the other hand, the incremental rotary encoder works more reliably and has higher linearity between output signals and the operated amount than the potentiometer. If the incremental rotary encoder is used, however, a cameraman must move the control part to a reference position (e.g., one of the rotational limits) to initialize the control unit upon turning on the control unit. This is not desirable in view of the convenience. Moreover, even in the case that the present position of the control part is recorded in a memory, etc. before the control unit is turned off, the position recorded in the memory does not correspond to the actual position if the control part is operated and moved while the control unit is off.

SUMMARY OF THE INVENTION

The present invention has been developed in view of the above-described circumstances, and has as its object the provision of a position determining device that has both a relative position determiner such as an incremental rotary encoder and an absolute position determiner such as a potentiometer, and that eliminates the necessity of initialization when the device is turned on and realizes a satisfactory linearity between the determined amount (the operated amount) and output signals, thus achieving the reliability and low cost.

To achieve the above-mentioned object, the present invention is directed to a position determining device for determining a position of a subject movable within a predetermined movement range, the position determining device comprising: a relative position determiner for determining a relative moving amount of the subject with respect to a reference point; and an absolute position determiner for determining an absolute position of the subject within the movement range; wherein the position determining device determines the position of the subject in accordance with data outputted from both of the relative position determiner and the absolute position determiner.

According to the present invention, when the position determining device is turned on, the absolute position determiner determines the present position of the subject, and thus, it is possible to recognize the reference position required for the relative position determiner in accordance with the data outputted from the absolute position determiner. This eliminates the necessity of initialization for setting the reference position, which is required by the conventional position determining device that consists of only the relative position determiner. Moreover, the position determining device of the present invention improves the reliability and achieves the low cost since it comprises the relative position determiner, which is reliable and has the satisfactory linearity between the determined amount and the output signals, and the absolute position determiner, which is relatively inexpensive.

To achieve the above-mentioned object, the present invention is directed to a position determining device for determining a position of a subject movable within a predetermined movement range, the position determining device comprising: a relative position determiner for determining a relative moving amount of the subject with respect to a reference point; and an absolute position determiner for determining an absolute position of the subject within the movement range; wherein: since the position determining device is turned on until the absolute position determiner detects the subject being at a limit of the movement range, the position determining device determines the position of the subject in accordance with data outputted from the absolute position determiner; and after the absolute position determiner detects the subject being at the limit of the movement range, the reference point for determination of the relative position determiner is established at the limit of the movement range of the subject, and the position determining device determines the position of the subject in accordance with data outputted from the relative position determiner.

According to the present invention, the position determining device uses both the relative position determiner and the absolute position determiner. When the position determining device is turned on, the position determining device determines the absolute position of the subject in accordance with the data outputted from the absolute position determiner. The position determining device determines the position of the subject in accordance with the data (the absolute position data) outputted from the absolute position determiner until the relative position determiner reaches one of the limits of the movement range, which is equivalent to the reference point for the determination of the relative position determiner. When the absolute position determiner detects the subject being at the limit of the movement range, the position determining device establishes the reference point for the determination of the relative position determiner at the limit of the movement range of the subject. Thereafter, the position determining device accurately determines the position of the subject in accordance with data outputted from the relative position determiner.

To achieve the above-mentioned object, the present invention is directed to a position determining device for determining a position of a subject movable within a predetermined movement range, the position determining device comprising: a relative position determiner for determining a relative moving amount of the subject with respect to a reference point; an absolute position determiner for determining an absolute position of the subject within the movement range; and a storage device for previously storing standard output data of the absolute position determiner corresponding to a plurality of positions of the subject within the movable range, and previously storing standard output data of the relative position determiner corresponding to the standard output data of the absolute position determiner, the reference point for the standard output data of the relative position determiner being established at a limit of the movement range of the subject; wherein, upon being turned on, the position determining device obtains data outputted from the absolute position determiner, then reads, from the storage device, the standard output data of the relative position determiner corresponding to the obtained data outputted from the absolute position determiner, thereafter determines the position of the subject in accordance with data outputted from the relative position determiner with reference to the read standard output data of the relative position determiner.

According to the present invention, when the position determining device is turned on, the position determining device determines the position of the subject in accordance with the data outputted from the absolute position determiner, and the relative position determiner is initialized correspondingly to the present position of the subject in accordance with the data, which is stored in the storage device and represents the relationship between the absolute position determiner and the relative position determiner. Consequently, the position determining device can accurately determine the position of the subject in accordance with the data outputted from the relative position determiner as soon as being turned on.

If the inexpensive absolute position determiner is used, there may be a problem relating to serious noise resulting from the deterioration of the absolute position determiner. In this case, the data outputted from the absolute position determiner is uneven when the position determining device is turned on, and it is therefore impossible to read the standard data recorded in the storage device with reference to the actual data outputted from the absolute position determiner. Hence, upon being turned on, the position determining device preferably obtains a plurality of pieces of the data outputted from the absolute position determiner and data outputted from the relative position determiner to judge reliability of the obtained data outputted from the absolute position determiner. Thus, whether the unevenness of the data outputted from the absolute position determiner results from the noise or the movement of the subject is judged. If the unevenness is judged as resulting from the noise, the data from the absolute position determiner is added and averaged, the stable data is sampled, or the like so that the position of the subject can be determined more accurately.

In the position determining device, the relative position determiner may comprise an incremental rotary encoder and a counter for counting encode pulses outputted from the rotary encoder; and the absolute position determiner may comprise a potentiometer.

In the position determining device, the subject may be a control member of a lens control unit for controlling at least one of focus and zoom of a TV lens electrically.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
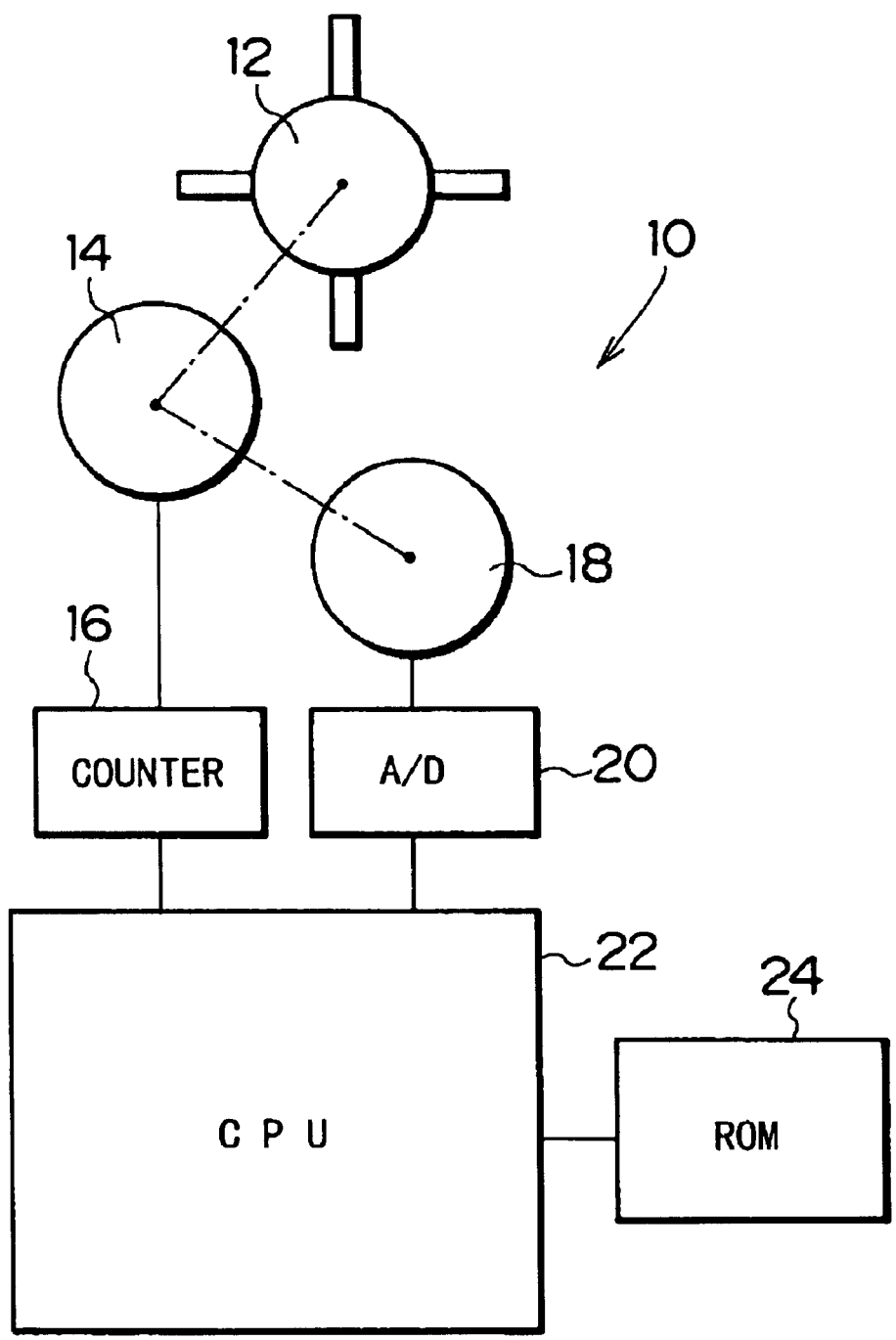
FIG. 1 is a block diagram illustrating the structure of a lens control unit, which employs a position determining device according to the first embodiment of the present invention.

FIG. 1 shows a TV camera lens control unit 10 to which a position determining device according to the first embodiment of the present invention is applied. The lens control unit 10 comprises a control knob 12, an incremental rotary encoder 14 for determining the operated amount of the control knob 12, a counter 16, a potentiometer (POT.) 18, an A/D converter 20, a central processing unit (CPU) 22, and a ROM 24, which stores a variety of data.

The control knob 12 is used to control the focus of a TV lens (not illustrated), and a lens control signal corresponding to the operated amount or a rotational position of the control knob 12 is transmitted from the CPU 22 to the lens.

Both the rotary encoder 14 and the potentiometer 18 are used to determine the rotational position of the control knob 12. The rotary encoder 14 outputs encode pulses corresponding to the rotational position of the control knob 12. The counter 16 counts the encode pulses outputted from the rotary encoder 14, and the CPU 22 reads the counted value of the counter 16. On the other hand, the potentiometer 18 outputs a voltage signal corresponding to the rotational position of the control knob 12. The outputted signal of the potentiometer 18 is applied to the A/D converter 20, which converts the applied signal into a digital signal, and the CPU 22 receives the digital signal.

Figure 2:
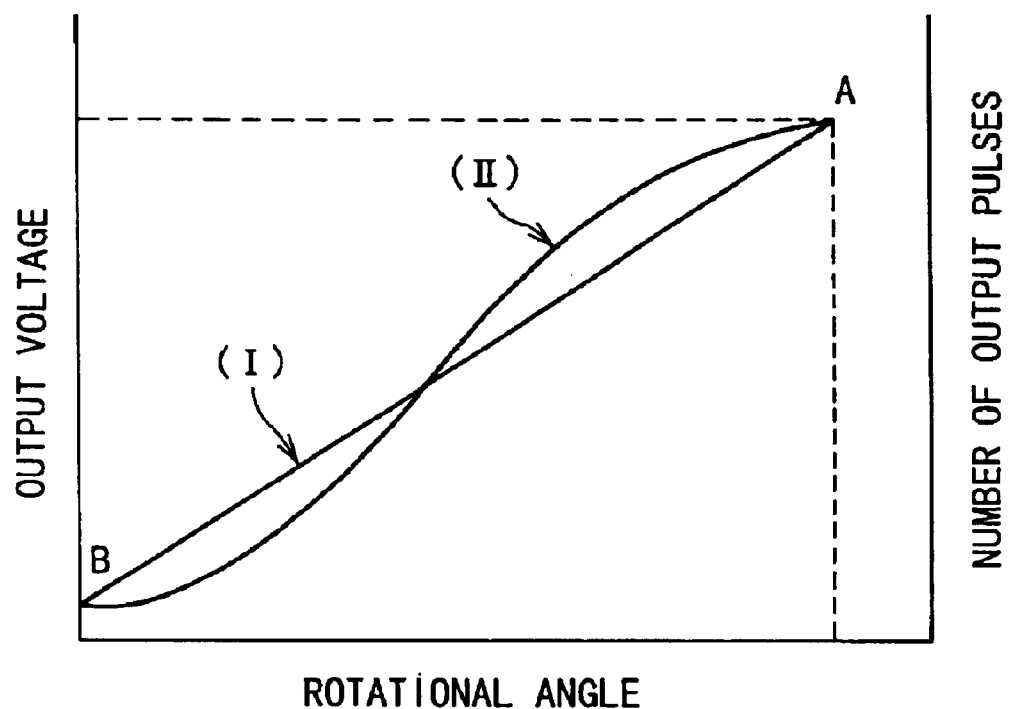
FIG. 2 is a graph showing the characteristics of a rotary encoder and a potentiometer in the lens control unit in FIG. 1.

FIG. 2 is a graph showing the characteristics of the rotary encoder 14 and the potentiometer 18. The horizontal axis is a reference for the rotational position or a rotational angle, the right vertical axis is a reference for the number of pulses output from the rotary encoder 14, and the left vertical axis is a reference for the output voltage of the potentiometer 18. A straight line (I) shows the characteristics of the rotary encoder 14, and a curve (II) shows the characteristics of the potentiometer 18.

As shown in FIG. 2, in the case of the rotary encoder 14 (the straight line (I)), the number of pulses changes linearly with respect to the rotational angle, and there is a high linearity between the output signal and the operated amount. On the other hand, in the case of the potentiometer 18 (the curve (II)), the output voltage is nonlinear to the rotational angle, and the output signal is not proportional to the operated amount.

Both the rotary encoder 14 and the potentiometer 18 are used to determine the operated amount or the rotational position of the control knob 12 as described below.

When the lens control unit 10 is manufactured, standard output voltages of the potentiometer 18 and standard values of the counter 16 of the rotary encoder 14 at the rotational limits (points A and B in FIG. 2) are found, and the standard output data of the potentiometer 18 and the rotary encoder 14 at both limits (the points A and B) is stored in the ROM 24.

Upon turning on of the lens control unit 10 (upon activation), the CPU 22 obtains data outputted from the potentiometer 18 through the A/D converter 20 and confirms the present position of the potentiometer 18. If the potentiometer 18 is not at the point A nor B, the operated amount of the control knob 12 is determined in accordance with the data that is obtained by digitizing the output voltage of the potentiometer 18. Then, when the potentiometer 18 reaches one of the points A and B on the rotation of the control knob 12, the standard value corresponding to the reached one of the points A and B is read from the ROM 24 and set on the counter 16 of the rotary encoder 14 as an initial value for the counting. Thereafter, the operated amount of the control knob 12 is determined in accordance with the data that is obtained by counting the pulses outputted from the rotary encoder 14 with reference to the set initial value.

If the potentiometer 18 is already at one of the points A and B when the position determining device 10 is turned on, the standard value corresponding to the one of the points A and B is immediately read from the ROM 24 and set on the counter 16 of the rotary encoder 14 as the initial value for the counting. Thereafter, the operated amount of the control knob 12 is determined in accordance with the data that is obtained by counting the pulses outputted from the rotary encoder 14 with reference to the set initial value.

A description will be given of the operation of the lens control unit 10, which employs the position determining device constructed in the above-mentioned manner.

Figure 3:
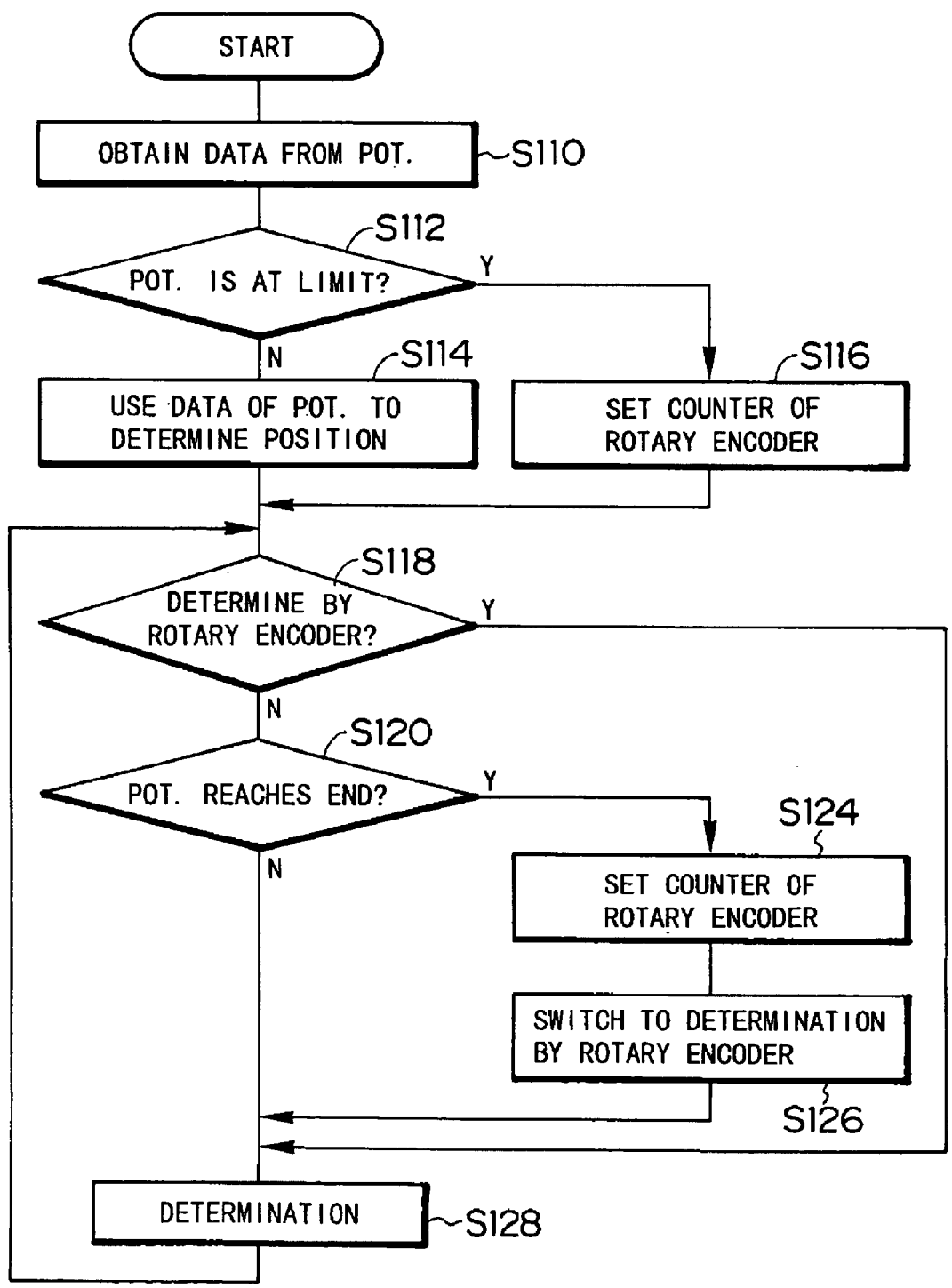
FIG. 3 is a flow chart showing the flow of the processing of the lens control unit in FIG. 1.

FIG. 3 is a flow chart illustrating the flow of the processing in the lens control unit 10 in FIG. 1. Upon turning on of the position determining device 10, the CPU 22 obtains the data outputted from the potentiometer 18 through the A/D converter 20 (S110). Then, the obtained data is compared with the standard output data of the potentiometer 18 at both limits (the points A and B) stored in the ROM 24 in order to judge whether the potentiometer 18 is at one of the limit points A and B (S112).

If the potentiometer 18 is not at the limit point A nor B, the data from the potentiometer 18 is used to determine the rotational position of the control knob 12 (S114). On the other hand, if the potentiometer 18 is already at one of the limit points at S112, the value corresponding to the one of the limit points is set on the counter 16 of the rotary encoder 14 as the initial value for the counting (S116), and thereafter, the data from the rotary encoder 14 is used to determine the rotational position of the control knob 12.

Then, whether the data from the rotary encoder 14 is used to determine the rotational position of the control knob 12 is judged (S118).

If the potentiometer 18 has not reached the limit point A nor B at S112, the judgement result at S118 is "NO", the procedure then goes to S120, where whether the potentiometer 18 is at one of the limit points A and B is judged again, and the judgement result at S120 is "NO". Then, the rotational position of the control knob 12 is determined in accordance with the data from the potentiometer 18 (S128).

Thereafter, the procedure returns from S128 to S118, where whether the data from the rotary encoder 14 is used to determine the rotational position of the control knob 12 is judged. While the data outputted from the potentiometer 18 is used to determine the rotational position of the control knob 12, the judgement result at S118 is "NO". Then, whether the potentiometer 18 is at one of the limit points A and B is judged (S120). If the potentiometer 18 has not reached the limit point A nor B, the procedure goes to S128 and the above-mentioned processing (S118–S128) is repeated.

On the other hand, if the potentiometer 18 reaches one of the limit points A and B on the rotation of the control knob 12 at S120, the standard value corresponding to the one of the limit points is set on the counter 16 of the rotary encoder 14 as the initial value on the counting (S124). Then, the determination of the rotational position of the control knob 12 switches to the determination in accordance with the data from the rotary encoder 14 (S126). Thereafter, the rotational position of the control knob 12 is determined in accordance with the data from the rotary encoder 14 (S128). At the following S118, the judgement result is "YES", which means that the data from the rotary encoder 14 is used to determine the rotational position of the control knob 12, and thus, the procedure goes to S128. Thereafter, the determination of the rotational position of the control knob 12 in accordance with the data from the rotary encoder 14 is continued.

If the potentiometer 18 is already at one of the limit positions A and B at the time of the judgement with reference to the data from the potentiometer 18 upon turning on of the lens control unit 10 (S112) and the data from the rotary encoder 14 is used to determine the rotational position of the control knob 12 (S116), the judgement result at S118 is "YES", which means that the data from the rotary encoder 14 is used to determine the rotational position of the control knob 12, and the procedure goes to S128. In such a case, the rotational position of the control knob 12 is determined in accordance with the data from the rotary encoder 14 just after the activation of the lens control unit 10.

As stated above, the operated amount of the control knob 12 is determined in accordance with the absolute position data from the potentiometer 18 since the lens control unit 10 is turned on until the potentiometer 18 reaches one of the limit points A and B. Then, when the potentiometer 18 reaches one of the limit points, the standard value corresponding to the one of the limit points is set on the counter 16 of the rotary encoder 14 as the initial value for the counting. Thereafter, the operated amount of the control knob 12 is determined in accordance with the relative position data from the rotary encoder 14.

In the first embodiment, the potentiometer 18 is set within the rotational range of the control knob 12 and within the acceptable range of input voltage of the A/D converter 20. Compared with the potentiometer for the conventional position determining device that uses only the potentiometer, the potentiometer 18 for the position determining device of the first embodiment is manufactured easily since there is no necessity of setting the potentiometer 18 precisely. Moreover, the potentiometer 18 in the first embodiment does not require much distinguishability, and thus, it is not so expensive. Therefore, the position determining device of the first embodiment can be manufactured at a low cost.

A description will now be given of the second embodiment according to the present invention.

In the position determining device as described with reference to FIG. 1, which uses both the rotary encoder 14 and the potentiometer 18, the following method may be adopted to solve the problem relating to the linearity of the potentiometer 18.

Figure 4:
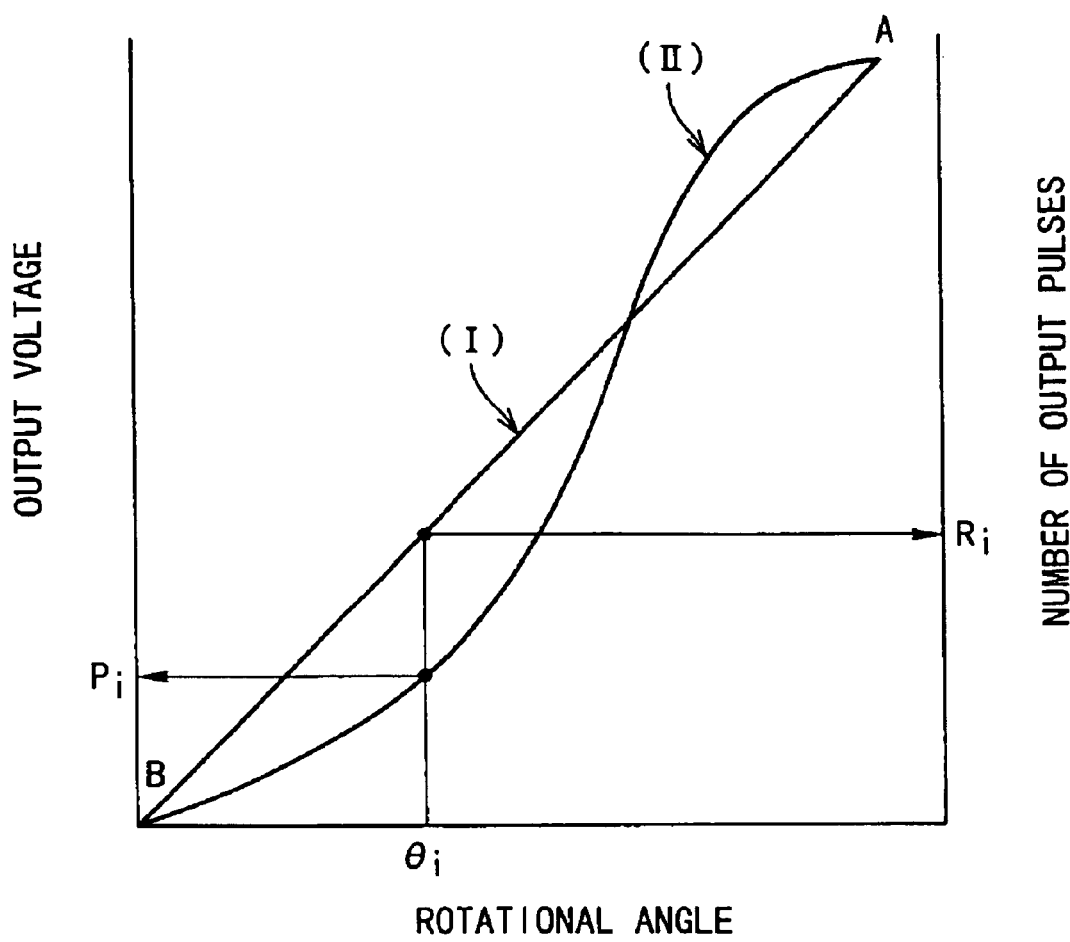
FIG. 4 is a graph of assistance in explaining the second embodiment of the present invention, showing the characteristics of the rotary encoder and the potentiometer.

As shown in FIG. 4, the standard output voltage $P_i$ of the potentiometer 18 at a certain rotational angle $\theta_i$, and the standard number of pulses $R_i$, outputted from the rotary encoder 14 corresponding to the standard output voltage $P_i$ are previously stored in the ROM 24 with the adequate distinguishability (e.g., 13 bit in the case of the focus control).

Upon activation, the data outputted from the potentiometer 18, which represents the present position of the potentiometer 18, is obtained, and the standard output data of the rotary encoder 14 corresponding to the obtained data from the potentiometer 18 is read from the ROM 24. The standard number of output pulses of the rotary encoder 14, which is read from the ROM 24 in the above-mentioned manner, is set on the counter 16 as the initial value for the counting. Thereafter, the rotational position of the control knob 12 is determined in accordance with the data that is obtained by counting the pulses outputted from the rotary encoder 14.

In the second embodiment, however, there is a noise problem resulting from the deterioration of the potentiometer 18, and in some cases, the position determined by the potentiometer 18 is not the actual position, and the standard number of output pulses of the rotary encoder 14 that is read from the ROM 24 according to the data from the potentiometer 18 and set on the counter 16 as the initial value for the counting is incorrect. In particular, if the inexpensive potentiometer is used, there is a serious noise problem resulting from the deterioration of the potentiometer 18.

To solve the above-mentioned problem, if the data from the potentiometer 18 is uneven, the data outputted from the rotary encoder 14 is read at the same time that the data from the potentiometer 18 is read in order to judge whether the potentiometer 18 works correctly. Thus, only the data that is determined as being reliable is referred to.

Figure 5:
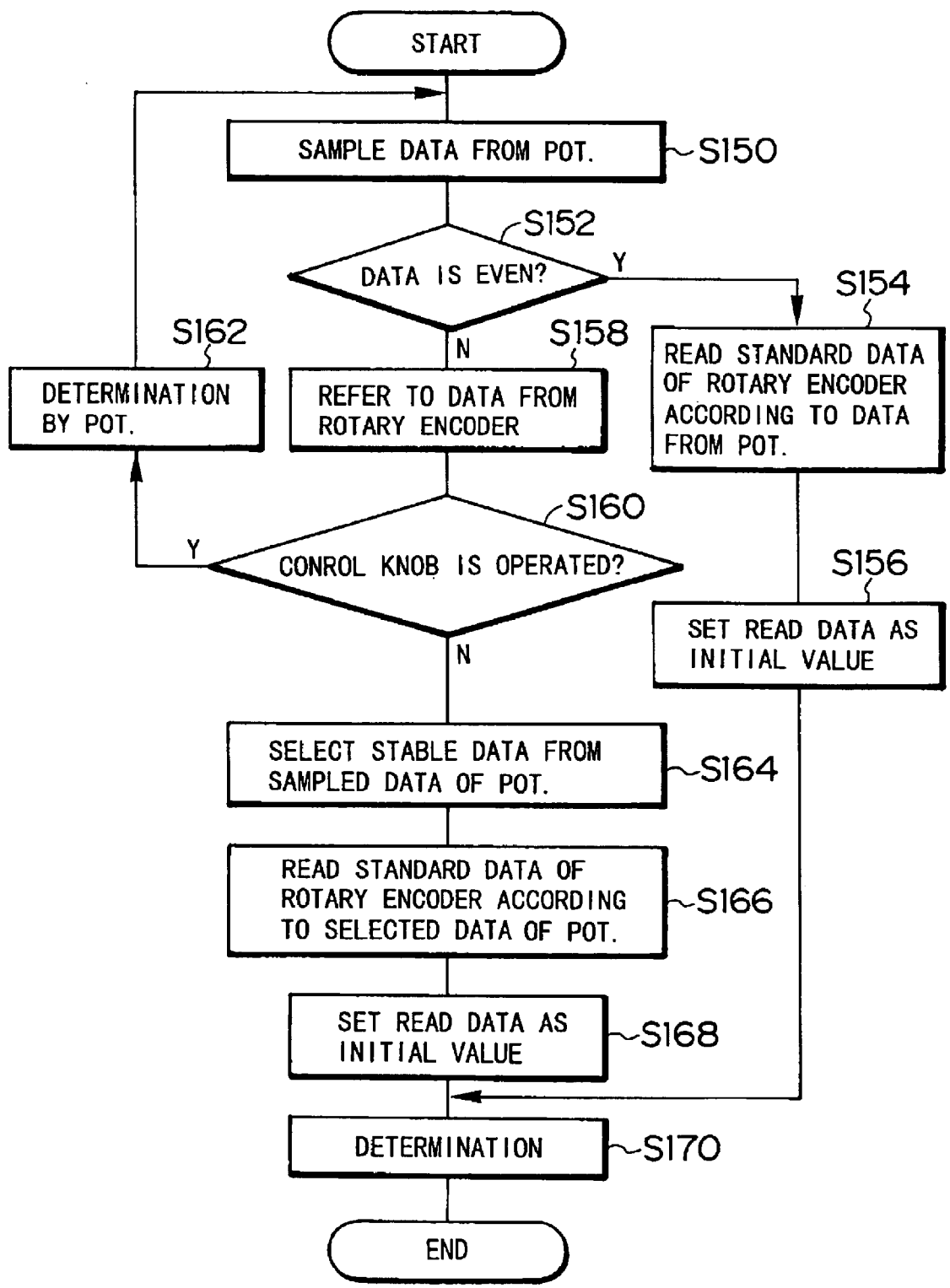
FIG. 5 is a flow chart showing the flow of the processing of the lens control unit, which employs a position determining device according to the second embodiment of the present invention.

FIG. 5 shows the flow of the processing in the lens control unit that employs the position determining device according to the second embodiment of the present invention. Upon turning on of the lens control unit, the data from the potentiometer 18 is obtained a plurality of times so that the plurality of pieces of data outputted from the potentiometer 18 are sampled (S150). The plurality of pieces of sampling data are judged whether the data is even, for example, by adding and averaging the data (S152). If the data is even, the standard number of output pulses of the rotary encoder 14 corresponding to the data outputted from the potentiometer 18 is read from the ROM 24 (S154). The read standard data is set on the counter 16 as the initial value for the counting (S156). Then, the counter 16 starts counting the pulses outputted from the rotary encoder 14 from the set initial value, and the operated amount of the control knob 12 is determined in accordance with the data from the rotary encoder 14 (S170).

On the other hand, if the sampling data from the potentiometer 18 is judged as being not even at S152, the data outputted from the rotary encoder 14 is referred to (S158) so that whether the control knob 12 is operated (rotated) is judged (S160). If it is judged that the sampling data is uneven as a result of the operation of the control knob 12, the operated amount of the control knob 12 is determined in accordance with the data from the potentiometer 18 (S162). Then, the procedure returns to S150.

On the other hand, if the control knob 12 is judged as not being operated at S160, it is judged that the sampling data is uneven though the control knob 12 is not operated. This means that the output signals of the potentiometer 18 include serious noise. In this case, the more stable data is selected from the data outputted from the potentiometer 18 sampled at S150, for example, by selecting the data close to the average (S164). Then, the standard number of output pulses of the rotary encoder 14 corresponding to the selected data of the potentiometer 18 is read from the ROM 24 (S166), and the read standard data is set on the counter 16 as the initial value for the counting (S168).

Thereafter, the counter 16 starts counting the pulses outputted from the rotary encoder 14 from the set initial value, and the operated amount of the control knob 12 is determined in accordance with the data from the rotary encoder 14 (S170).

In the above-described embodiments, the position determining device of the present invention is applied to the lens control unit in order to determine the operated position of the control knob 12, but the position determining device of the present invention may also be applied to, for example, a means for determining the position of a movable lens, which moves forward and backward along the optical axis. In other words, the position determining device of the present invention may be applied to a variety of position determining devices that conventionally consist of either one of the potentiometer and the rotary encoder.

As set forth hereinabove, according to the position determining device of the present invention, both the relative position determiner and the absolute position determiner are used to determine the position of the subject or the movable part with reference to the data obtained from both of the relative position determiner and the absolute position determiner as the need arises. This eliminates the necessity of initialization for setting the reference position, which is required by the conventional position determining device that consists of only the relative position determiner. Moreover, the position determining device of the present invention improves the reliability and achieves the low cost since it comprises the relative position determiner, which is reliable and has the satisfactory linearity between the determined amount and the output signals, and the absolute position determiner, which is relatively inexpensive.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A position determining device for determining a position of a subject movable within a predetermined movement range, the position determining device comprising:
   a relative position determiner for determining a relative movement amount of the subject with respect to a reference point; and
   an absolute position determiner for determining an absolute position of the subject within the movement range; wherein said position determining device determines the position of the subject in accordance with data outputted from the absolute position determiner and said position determining device operates until the absolute position determiner detects the subject reaching a limit of the movement range; and
   the reference point for determination of the relative position determiner is established at the limit of the movement range of the subject after the absolute position determiner detects the subject reaching the limit of the movement range, and the position determining device determines the position of the subject in accordance with data outputted from the relative position determiner, and upon activation of the positioning determining device, the position determining device obtains the absolute position of the subject within the movement range outputted from the absolute position determiner without performing an initialization process upon activation, wherein said initialization process includes moving the subject to a predetermined position upon activation.

2. The position determining device according to claim 1, wherein:

the relative position determiner comprises an incremental rotary encoder and a counter for counting encode pulses outputted from the rotary encoder; and the absolute position determiner comprises a potentiometer.

3. The position determining device according to claim 1, wherein the subject is a control member of a lens control unit for electrically controlling at least one of focus and zoom of a TV lens.

4. A position determining device for determining a position of a subject movable within a predetermined movement range, the position determining device comprising:

a relative position determiner for determining a relative movement amount of the subject with respect to a reference point;

an absolute position determiner for determining an absolute position of the subject within the movement range; and a storage device for previously storing standard output data of the absolute position determiner corresponding to a plurality of positions of the subject within the movable range, and previously storing standard output data of the relative position determiner corresponding to the standard output data of the absolute position determiner, the reference point for the standard output data of the relative position determiner being established at a limit of the movement range of the subject;

wherein the position determining device obtains data outputted from the absolute position determiner upon being turned on without performing an initialization process upon being turned on, wherein said initialization process includes moving the subject to a predetermined position upon being turned on and the position determining device then reads the standard output data of the relative position determiner corresponding to the obtained data outputted from the absolute position determiner from the storage device, and thereafter determines the position of the subject in accordance with data outputted from the relative position determiner with reference to the read standard output data of the relative position determiner.

5. The position determining device according to claim 4, wherein the position determining device obtains a plurality of pieces of the data outputted from the absolute position determiner and data outputted from the relative position determiner to judge reliability of the obtained data outputted from the absolute position determiner upon being turned on.

6. The position determining device according to claim 4, wherein:

the relative position determiner comprises an incremental rotary encoder and a counter for counting encode pulses outputted from the rotary encoder; and the absolute position determiner comprises a potentiometer.

7. The position determining device according to claim 4, wherein the subject is a control member of a lens control unit for electrically controlling at least one of focus and zoom of a TV lens.

8. A method of determining a position of a subject movable within a predetermined movement range with a position determining device, the position determining device including a relative position determiner for determining a relative movement amount of the subject with respect to a reference point; and an absolute position determiner for determining an absolute position of the subject within the movement range; said method including the steps of:

determining the position of the subject with said position determining device in accordance with data outputted from the absolute position determiner without performing an initialization process upon activation of the position determining device, wherein said initialization process includes moving the subject to a predetermined position upon activation;

operating said position determining device until the absolute position determiner detects the subject reaching a limit of the movement range, wherein the position determining device is turned on until the absolute position determiner detects the subject being at a limit of the movement range; and determining the reference point for determination of the relative position determiner at the limit of the movement range of the subject after the absolute position determiner detects the subject reaching the limit of the movement range, and determining the position of the subject in accordance with data outputted from the relative position determiner with the position determining device.

9. A method of determining a position of a subject movable within a predetermined movement range with a position determining device, the position determining device including a relative position determiner for determining a relative movement amount of the subject with respect to a reference point; an absolute position determiner for determining an absolute position of the subject within the movement range; and a storage device for previously storing standard output data of the absolute position determiner corresponding to a plurality of positions of the subject within the movable range, said method comprising the steps of:

previously storing standard output data of the relative position determiner corresponding to the standard output data of the absolute position determiner;

determining the reference point for the standard output data of the relative position determiner at a limit of the movement range of the subject;

obtaining data outputted from the absolute position determiner with the position determining device upon the position determining device being turned on and without performing an initialization process, wherein said initialization process includes moving the subject to a predetermined position upon being turned on;

reading the standard output data of the relative position determiner corresponding to the obtained data outputted from the absolute position determiner from the storage device with the position determining device, and determining the position of the subject in accordance with data outputted from the relative position determiner with reference to the read standard output data of the relative position determiner.

10. The positioning determining device according to claim 1, wherein the absolute position determiner is used upon activation for determining the position of the subject without initializing the relative position determiner when the subject is within the limit of the movement range.

11. The positioning determining device according to claim 1, wherein the relative position determiner is used for determining the position of the subject when the subject is at the limit of the movement range.

12. The positioning determining device according to claim 10, wherein the relative position determiner is used for determining the position of the subject when the subject is at the limit of the movement range.

* * * * *